United States Patent
Kansakoski et al.

(10) Patent No.: US 6,570,909 B1
(45) Date of Patent: May 27, 2003

(54) INTERFERENCE SUPPRESSION IN A CDMA RECEIVER

(75) Inventors: Antti Kansakoski, San Diego, CA (US); Jean-Marie Tran, San Diego, CA (US)

(73) Assignee: Nokia Mobile Phones, San Diego, CA (US)

( * ) Notice: Subject to any disclaimer, the term of this patent is extended or adjusted under 35 U.S.C. 154(b) by 0 days.

(21) Appl. No.: 09/350,211

(22) Filed: Jul. 9, 1999

(51) Int. Cl.[7] .............................................. H04B 15/00
(52) U.S. Cl. ........................ 375/148; 375/136; 375/144; 375/148; 375/224; 375/316; 375/295; 375/367; 375/142; 375/143; 375/150; 375/152; 370/252; 370/335; 370/342; 370/441
(58) Field of Search .................. 375/316, 295, 375/224, 148, 147, 144, 140, 136, 130, 142, 150, 143, 152, 367; 370/335, 252, 342, 441

(56) References Cited

U.S. PATENT DOCUMENTS

| 5,598,428 A | * | 1/1997 | Sato | 375/206 |
| 5,894,473 A | * | 4/1999 | Dent | 370/342 |
| 6,067,292 A | * | 5/2000 | Huang et al. | 370/342 |

FOREIGN PATENT DOCUMENTS

| EP | 0 671 820 | 9/1995 |
| EP | 0 876 002 | 11/1998 |

OTHER PUBLICATIONS

Huang et al., "Improving Detection and Estimation in Pilot-Aided Frequency Selective CDMA Channels," *IEEE*, 1997, pp. 198–201.

* cited by examiner

*Primary Examiner*—Chi Pham
*Assistant Examiner*—Pankaj Kumar
(74) *Attorney, Agent, or Firm*—Milan I. Patel; Thomas R. Weber

(57) ABSTRACT

A system and method for canceling interference present in a code-division multiple access (CDMA) channel signal received at a CDMA receiver that is caused by multipath components of a transmitted pilot channel signal or by soft handoff conditions is computationally efficient because it operates at symbol rates. The channel signal from which such multipath interference is canceled can be either a traffic (data) channel or the pilot channel itself. Interference signals are produced in groups corresponding to the fingers of the CDMA rake receiver. The interference signals corresponding to each finger are used to cancel interference in the other fingers.

25 Claims, 3 Drawing Sheets

INTERFERENCE SUPPRESSION IN A CDMA RECEIVER

BACKGROUND OF THE INVENTION

1. Field of the Invention

The present invention relates generally to a method and device for suppressing interference between the pilot channel and other channels in a code-division multiple access (CDMA) mobile telephone system.

2. Description of the Related Art

In accordance with Telecommunications Industry Association (TIA) standard IS-95 for CDMA telephone systems, each base station operates a pilot channel, a sync channel and forward traffic channels. These channels operate in the same frequency bandwidth and are made orthogonal to one another by the use of Walsh codes. Nevertheless, the orthogonality is degraded in a multipath environment and during soft handoff, and multipath components can interfere with one another. A non-orthogonal or noise contribution causes degradation in the pilot and traffic channel signals and the resulting output of the Rake detector. The pilot channel has the greatest likelihood of interfering with the other channels because it represents approximately 20 percent of total transmitted base station power. The pilot channel is an unmodulated, direct-sequence spread spectrum signal transmitted continuously by each CDMA base station. The pilot channel allows a mobile station to acquire the forward channel timing, provides a phase reference for coherent demodulation, and provides a basis for signal strength comparisons between base stations to facilitate soft handoff.

It has been suggested to cancel multipath noise contributed by the pilot signal. In one such system, a recursive method is used to reconstruct and subtract the multipath noise from the Rake finger inputs on the current symbol interval from the estimated channel coefficients on the previous symbol interval. A disadvantage of this system is that its circuit implementation is complex, computationally intensive, and uneconomical because the noise is canceled from the received signal before the signal is despread. It would be desirable to provide a system and method that suppresses interference caused by the pilot signal that is less complex and more economical than prior systems. The present invention addresses these problems and deficiencies in the manner described below.

SUMMARY OF THE INVENTION

The present invention relates to a system and method for canceling interference present in a code-division multiple access (CDMA) channel signal received at a CDMA receiver that is caused by multipath components of a transmitted pilot channel signal. The channel signal from which such multipath interference is canceled can be either a traffic (data) channel or the pilot channel itself. Some embodiments of the present invention can cancel interference from either the traffic channel or the pilot channel in accordance with a selector input signal. Although the terms "pilot channel" and "traffic channel" are used herein for convenience because they are used in the IS-95 CDMA specification, it is understood that any analogous CDMA system in which an unmodulated channel and a data channel based upon the unmodulated channel are referred to by other names is within the scope of the present invention.

In a CDMA receiver that includes a conventional n-finger Rake receiver, the system includes n cancellation circuits, one corresponding to each finger. Each cancellation circuit (corresponding to one of the fingers) produces n−1 interference signals, each corresponding to one of the other n−1 fingers. In embodiments of the invention in which pilot channel interference is canceled from the traffic channel, the cancellation circuit (corresponding to one of the fingers) produces each of the n−1 interference signals in response to the receiver's locally generated traffic channel pseudonoise (pn) sequence corresponding to that finger and one of the receiver's n locally generated pilot channel pn sequences corresponding to another one of the fingers. In embodiments of the invention in which pilot channel interference is canceled from the pilot channel itself, the cancellation circuit (corresponding to one of the fingers) produces each of the interference signals in response to the receiver's locally generated pilot channel pn sequence corresponding to that finger and one of the receiver's n locally generated pilot channel pn sequences corresponding to another one of the fingers. In an exemplary embodiment, the cancellation circuit interpolates the locally generated pilot channel pn sequence corresponding to another finger before using into generate intermediate samples between pn chips. Also, in the exemplary embodiment, the interpolator is a digital filter having an impulse response approximating a convolution of the output filter of the transmitter and the input filter of the receiver.

Each cancellation circuit also produces n−1 correction signals. The cancellation circuit (corresponding to one of the fingers) produces each of the n−1 correction signals in response to the interference signal corresponding to another one of the fingers and the received pilot channel signal corresponding to that other finger. The received pilot signal of the other finger represents an estimate of the gain and phase of the multipath pilot signal to be canceled.

The system also includes n correction circuits, one corresponding to each finger. In embodiments of the invention in which pilot channel interference is canceled from the traffic channel, the correction circuit (corresponding to one of the fingers) subtracts each of the n−1 correction signals corresponding to that finger from the received traffic channel signal corresponding to that finger. In embodiments of the invention in which pilot channel interference is canceled from the pilot channel itself, the correction circuit (corresponding to one of the fingers) subtracts each of the n−1 correction signals corresponding to that finger from the received pilot channel signal corresponding to that finger.

The present invention is more efficient, economical and consumes less power than prior cancellation systems because, by subtracting the interfering multipath pilot signal components from the received traffic or pilot signal, i.e., after the receiver has despread it, the cancellation and correction circuits can operate at symbol rates rather than chip rates.

BRIEF DESCRIPTION OF THE DRAWINGS

Understanding the present invention will be facilitated by consideration of the following detailed description of a preferred embodiment of the present invention taken in conjunction with the accompanying drawings, in which like numeral refer to like parts and in which.

DETAILED DESCRIPTION OF A PREFERRED EMBODIMENT

Figure 1:
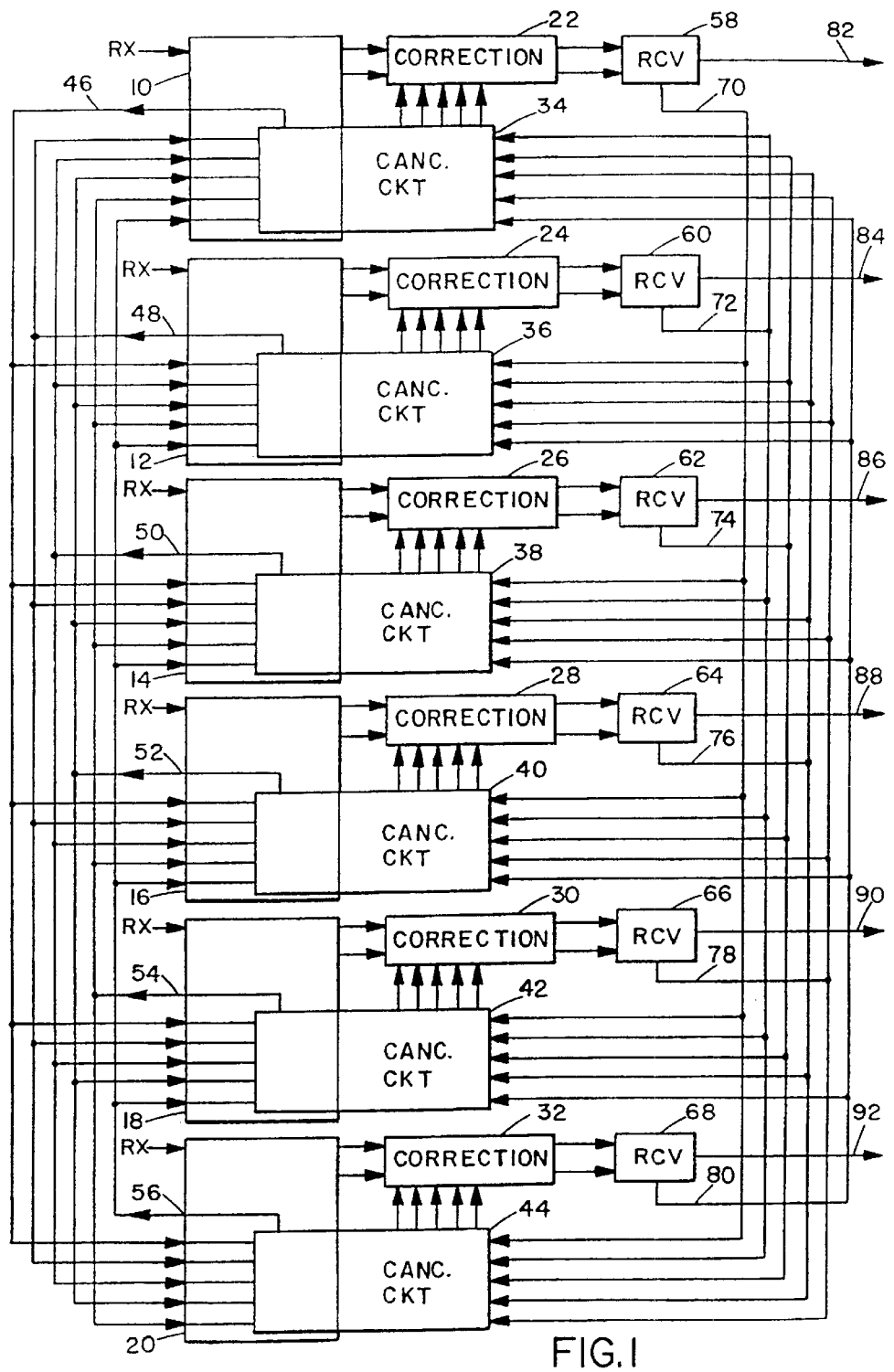
FIG. 1 is a block diagram of a portion of a CDMA receiver that includes a system for canceling interference in either a traffic channel or the pilot channel caused by multipath reception of the pilot channel.

As illustrated in FIG. 1, a CDMA mobile telephone receiver has a six-finger Rake detector circuit (not shown in its entirety), including six corresponding finger circuits 10, 12, 14, 16, 18 and 20. Although the illustrated receiver uses six fingers, essentially any suitable number (n) of fingers could be used. The IS-95 CDMA standard describes the use of three fingers. As in a conventional CDMA receiver, each finger receives the complex baseband transmitted signal ("Rx") and demodulates or despreads one of the six strongest multipath signals into a pilot channel signal $f1_p(k)$ and a traffic (data) channel signal $f1_d(k)$. The traffic channel signal can be expressed as:

$$f1_d(k) = \sum_{i=0}^{63} x'_r(zT_s)c'(z)'W'_n(z) \quad (1)$$

$$= A_{1d}(k) + B_{1d}(k) + C_{1d}(k) \quad (2)$$

where $x'_r(t)$ represents the received and filtered signal, $z=(64k+i)$, the chip rate $1/T_s=1.2288*10^6$ s, $c'(n)$ represents the pseudonoise (pn) code generated locally at the receiver, $W'_n(z)$ represents a Walsh code generated locally at the receiver, $A_{1d}(k)$ represents the desired complex data, $B_{1d}(k)$ represents the interfering multipath pilot signal, and $C_{1d}(k)$ represents other interference not corrected by the present invention. Note that the equations are based upon an exemplary system in which the symbol rate is 64 chips per symbol and the waveform corresponds to IS-95 modulation. Also note that although the equations assume the existence of two multipath signals, they are readily extended to any number. The data portion of the signal can be expressed as:

$$A_{1d}(k) = 128b(k)\sqrt{E_{cd}}g_1(k)e^{j\Theta_1(k)} \quad (3)$$

$$B_{1d}(k) = \sqrt{E_{cp}}g_2(k)e^{j\Theta_2(k)} \quad (4)$$

$$\sum_{i=0}^{63} \{c(z - \lfloor \tau/T_s \rfloor)c'(z)'W'_n(z) * (h(zT_s - \lfloor \tau/T_s \rfloor)) * (h'(z))\}$$

where $b(k)$ represents the data symbols, $E_{cd}$ represents energy per chip for the traffic (data) channel, $\tau$ represents the path delay, g represents the multipath signal gain, $e^{j\Theta(k)}$ represents the multipath signal phase, h represents the transmitter output filter, and h' represents the receiver input filter. (Note assumptions that: $c'(z)=c(z)$, i.e., receiver pn code aligned with transmitted pn code; $h(zT_s)* h'(z)=1$, i.e., perfectly matched filters; and $W(z)=W'(z)$, i.e., receiver Walsh code aligned with transmitter Walsh code.) The pilot channel signal can be expressed similarly, the only difference being that the term $W'_n(z)$ is not present. Although the corresponding pilot channel signal equations are omitted for this reason, the description herein of noise cancellation in the traffic channel signal applies to noise cancellation in the pilot channel signal as well.

Each of the pilot and traffic channel signals that is despread by finger circuits 10, 12, 14, 16, 18 and 20 is provided to one of six corresponding correction circuits 22, 24, 26, 28, 30 and 32, which cancels or subtracts out the interfering multipath pilot signal as described below in further detail. The term $B_{1d}(k)$ set forth in Equation 4, which represents the interfering pilot, is the quantity that is subtracted out. Six cancellation circuits 34, 36, 38, 40, 42 and 44, one corresponding to each finger, produce this interference term. The interference term can be readily determined because the multipath amplitude and phase, the cross-correlations of the interfering pn and locally generated pn, and the convolution of the transmitter pulse-shaping filter and receiver filter are all known or predetermined, i.e., they can be estimated empirically from received data. Each of cancellation circuits 34, 36, 38, 40, 42 and 44 produces five correction signals that are to be subtracted out.

Correction circuits 22, 24, 26, 28, 30 and 32 provide the corrected pilot and traffic channel signals to the remaining receiver circuitry 58, 60, 62, 64, 66 and 68, respectively. Circuitry 58, 60, 62, 64, 66 and 68 are described in further detail below, and perform some functions to produce the received pilot channel signals 70, 72, 74, 76, 78 and 80 and received traffic channel signals 82, 84, 86, 88, 90 and 92. Each of circuitry 58, 60, 62, 64, 66 and 68 provides its received pilot channel signal to the cancellation circuits of the other five fingers. Although not illustrated for purposes of clarity, the received traffic channel signals are combined and passed to a Viterbi decoder in the conventional manner.

As described more fully below, in response to their pilot channel pn sequences, finger circuits 10, 12, 14, 16, 18 and 20 produce signals 46, 48, 50, 52, 54 and 56, respectively, each of which is provided to the other five finger circuits. The system includes a means (not shown in FIG. 1 for purposes of clarity) for selecting whether the pilot channel multipath noise that is present in the traffic channel signal is canceled or whether the pilot channel multipath noise that is present in the pilot channel signal itself is canceled. In either event, each of cancellation circuits 34, 36, 38, 40, 42 and 44 produces each of the five correction signals in response to the pn sequence of the signal selected for cancellation, the pilot channel pn sequence corresponding to one of the other fingers, and the received pilot channel signal corresponding to that other finger. Thus, for example, cancellation circuit 34 (which corresponds to the first finger) produces the first of its five correction signals in response to the selected signal, the pilot channel pn sequence corresponding to the second finger, and the received pilot channel signal 72 corresponding to the second finger; produces the second correction signal in response to the selected signal, the pilot channel pn sequence corresponding to the third finger, and the received pilot channel signal 74 corresponding to the third finger; produces the third correction signal in response to the selected signal, the pilot channel pn sequence corresponding to the fourth finger, and the received pilot channel signal 76 corresponding to the fourth finger; produces the fifth correction signal in response to the selected signal, the pilot channel pn sequence 78 corresponding to the fifth finger, and the received pilot channel signal corresponding to the fifth finger, and produces the sixth correction signal in response to the selected signal, the pilot channel pn sequence corresponding to the sixth finger, and the received pilot channel signal 80 corresponding to the sixth finger. Similarly, for example, cancellation circuit 36 (which corresponds to the second finger) produces the first of its five correction signals in response to the selected signal, the pilot channel pn sequence corresponding to the first finger, and the received pilot channel signal 70 corresponding to the first finger; produces the second correction signal in response to the selected signal, the pilot channel pn sequence corresponding to the third finger, and the received pilot channel signal 74 corresponding to the third finger; produces the third correction signal in response to the selected signal, the pilot channel pn sequence corresponding to the fourth finger, and the received pilot channel signal 76 corresponding to the fourth finger; produces the fifth correction signal in response to the selected signal, the pilot channel pn sequence corresponding to the fifth finger, and the received pilot channel signal 78 corresponding to the fifth finger; and produces the sixth correction signal in response to the selected signal, the pilot channel pn sequence corresponding to the sixth finger, and the received pilot channel signal 80 corresponding to the sixth finger. The third, fourth, fifth and sixth fingers are configured in the same manner.

Figure 2:
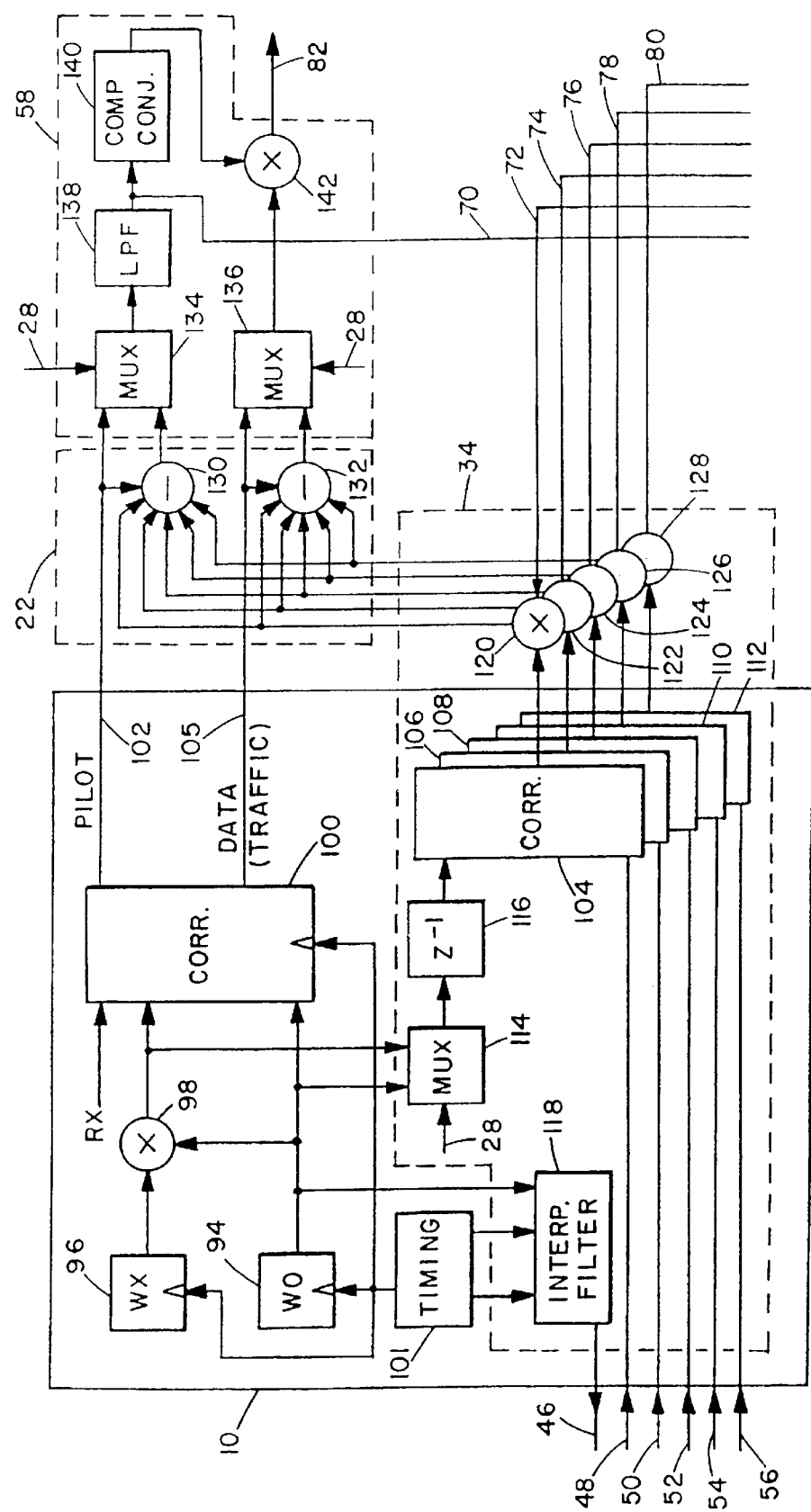
FIG. 2 is a block diagram of the elements of the system that correspond to one finger of a six-finger Rake detector in the receiver.

The elements of the system corresponding to the first finger are illustrated in further detail in FIG. 2. The other five fingers are not described or illustrated in similar detail because they are essentially the same as the first finger. First finger circuit 10 includes, among other elements, a pn sequence generator 94, a Walsh code generator 96, a multiplier 98 and a correlator 100. As is conventional in CDMA receivers, sequence generator 94 provides a pn sequence representing the pilot channel (Walsh channel zero) to correlator 100. Multiplier 98 multiplies the locally generated pn sequence by a Walsh code defining a traffic channel and provides the resulting pn sequence to correlator 100. Timing circuitry 101 controls the operation of these elements at the chip rate of 1.2288 MHZ. Correlator 100 also produces the baseband received signal Rx. In response to these signals, correlator 100 produces a despread pilot channel signal 102 and traffic channel signal 103 in the conventional manner.

Cancellation circuit 34 includes five cancellation correlators 104, 106, 108, 110 and 112. Each performs the convolution operation indicated in Equation 4 above over an exemplary interval of 64 chips per symbol. The term c'(z) 'W$_n$'(z) in Equation 4 is defined by the selected signal that is provided to cancellation correlators 104, 106, 108, 110 and 112. As indicated above, whether the system cancels interference in pilot channel signal 102 or traffic channel signal 103 is determined by a multiplexer 114. In response to a selection signal, multiplexer 114 provides to correlators 104, 106, 108, 110 and 112 either the (pilot channel) pn sequence signal or the Walsh-encoded (traffic channel) pn sequence signal, via a delay element 116. (As persons of skill in the art understand, such delay elements can be included in any suitable signal paths in the system to ensure that the correction signals are applied in proper synchronism or alignment with the signals to be corrected.) The selection signal can be generated in any suitable manner, and is preferably maintained in a constant state during operation. It is contemplated that the selection signal will typically be set to a state that selects the traffic channel signal. The pilot channel signal may be so strong that the benefit of canceling interfering pilot channel components in the pilot channel may be relatively low.

The other terms involved in the convolution operation in Equation 4 are defined by the remaining inputs to cancellation correlators 104, 106, 108, 110 and 112. The term $(h(zT_s - \lfloor T/T_s \rfloor))*(h'(z))$ represents the convolution of the transmitter and receiver filters (not shown). A digital interpolation filter 118 provides this function because it has an impulse response that approximates the convolution of the transmitter and the receiver filters. Interpolation filter 118 operates in response to the pilot channel pn sequence signal, the chip rate clock signal it receives from timing circuitry 101 and a faster clock signal (e.g., 9.8304 MHZ) it also receives from timing circuitry 101. The interpolation aspect refers to the interpolation of the pilot channel pn sequence from 1.2288 MHZ to 9.8304 MHZ. Interpolation filter 118 samples the pilot channel pn sequence signal at the 9.8304 MHZ rate and applies suitable interpolation algorithm. From the equations and other description provided above, persons of skill in the art will readily be capable of designing a suitable interpolation filter 118 or other means for performing the interpolation. As such persons will appreciate, selection of the filter coefficients will depend upon the transmitter and receiver filters, the clocking rates and other factors.

Each of cancellation correlators 104, 106, 108, 110 and 112 produces an interference signal that is provided to one of five multipliers 120, 122, 124, 126 and 128. The correction signals $B_{1,d}(k)$ can then be produced by multiplying the interference signals by the received pilot channel signals, which represent the multipath phase and gain term in Equation 4.

A subtractor 130 subtracts all five correction signals from pilot channel signal 102 to form a corrected pilot channel signal. Another subtractor 132 subtracts all five correction signals from traffic channel signal 103 to form a corrected traffic channel signal. Subtraction of the $B_{1,d}(k)$ term from Equation 2 leaves only the desired traffic channel signal term $A_{1,d}(k)$ and the "other interference" term $C_{1,d}(k)$ in the received traffic channel signal. Although the corresponding equation for the pilot channel is not shown, subtraction of a $B_{1,p}(k)$ term would similarly leave the desired pilot channel signal term $A_{1,p}(k)$ and the "other interference" term $C_{1,p}(k)$ in the received pilot channel signal.

A multiplexer 134, operating in response to the selection signal described above, selects either the corrected pilot channel signal or the uncorrected pilot channel signal. Another multiplexer 136, also operating in response to the selection signal described above (or to a similar selection signal), selects either the corrected traffic channel signal or the uncorrected traffic channel signal.

The remaining circuitry is conventional in a CDMA receiver and includes a low-pass filter 138 for filtering the pilot channel signal, and a complex conjugate circuit 140 and multiplier 142 for removing the phase error from the received traffic channel signal. Note that received pilot channel signal 70 is preferably taken following low-pass filter 138.

From the foregoing, it can be seen that a plurality of a noise reduction circuits are formed where each noise reduction circuit includes at least one digital filter (interpolator) 118, at least one correlator 104, a multiplier 120, and a subtractor 130. As shown in the FIG. 1 and FIG. 2, the digital filter 118 in corresponding to each cancellation circuits 34–44 other provides an interpolated pilot channel pn sequence to each of the other cancellation circuits 34–44.

Therefore, in an embodiment of the invention, an interference signal is produced for each of the pilot channel pn sequence (48–56) by correlating the despreading sequence for the particular finger 10 of the receiver with the pilot channel pn sequences 48–50 from the other fingers 12–20 in a plurality of correlators 104–112. The resulting interference signals are multiplied by the their corresponding received pilot signals in the plurality of multipliers 120–128 to produce the correction signals. As explained above the correction signals are subtracted from the received traffic channel signal to reduce the noise level of the signal. Those skilled in the art will recognize that various configurations can be formed either in hardware or software to perform the described functions.

Figure 3:
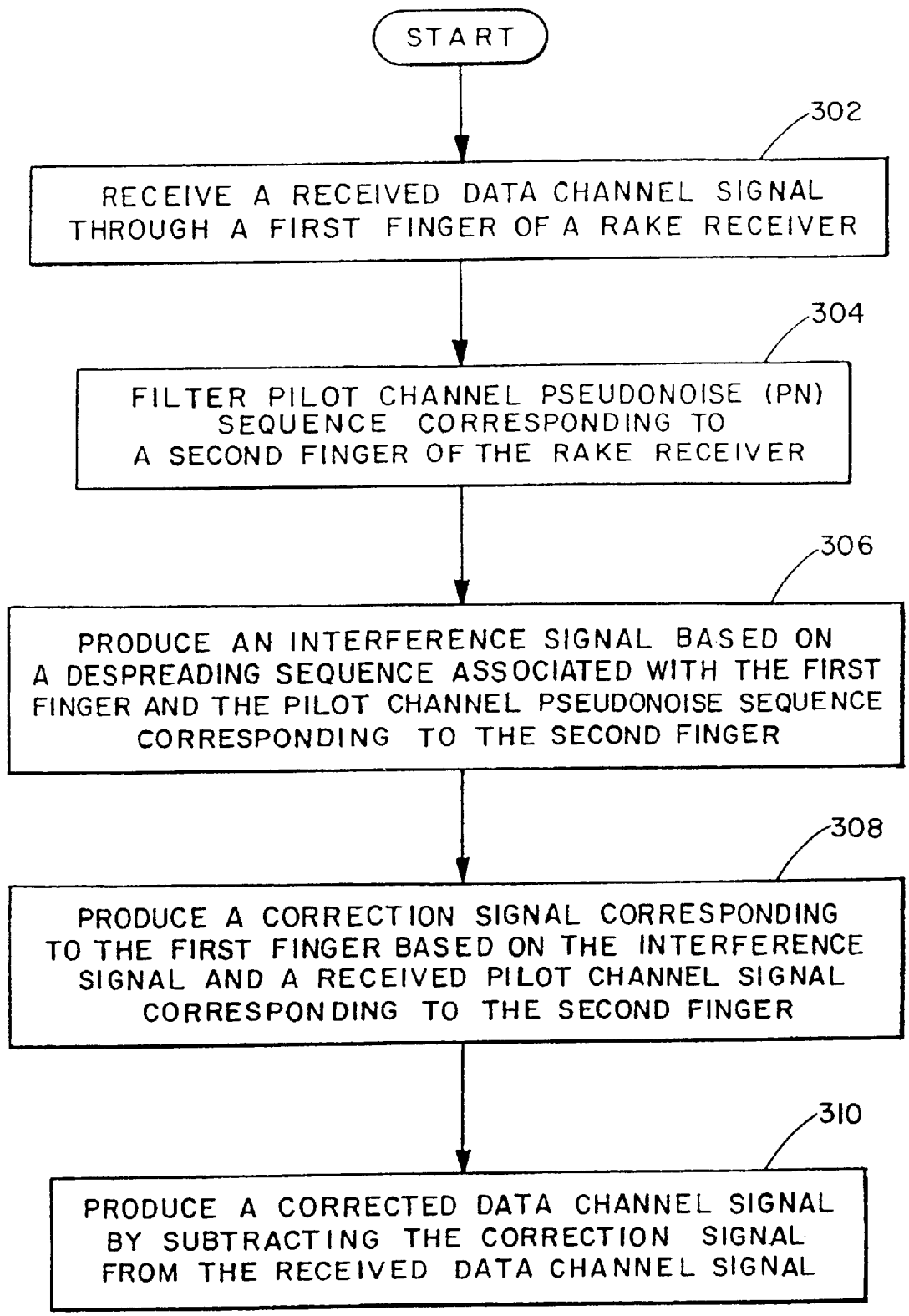
FIG. 3 is a flow chart of a method of reducing noise in a traffic channel in accordance with an embodiment of the invention.

FIG. 3 is a flow chart of a method of reducing noise in a traffic channel in accordance with an embodiment of the invention. The method can be performed using various hardware and software and may be implemented with a digital signal processor, controller, digital processor or any other type of signal processor or combination of processors.

At step 302, a received data (traffic) channel signal is received at a first finger 10 of a rake receiver. The received data channel signal is preferably received using known methods of receiving a data signal in CDMA systems using a correlator 100 and a pilot signal.

At step 304, the pilot channel pseudonoise sequence corresponding to a second finger (12–20) is filtered. As described above, the digital interpolator filer 118 has a response based on the input filter of the CDMA receiver and the output filter of the transmitter, and interpolates the pilot channel pn sequence between chip periods to produce an interpolated pilot channel pn sequence.

At step 306, an interference signal is produced based on the despreading sequence associated with the second finger and the pilot channel pseudonoise sequence. Preferably, the interpolated pilot channel pn sequence is correlated with the despreading sequence in a correlator 104.

At step 308, a correction signal corresponding to the first finger is produced based on the interference signal and the received pilot channel signal corresponding to the second finger. The correction signal is preferably produced by multiplying the interference signal with the received pilot channel signal.

At step 310, a corrected data channel signal is produced by subtracting the correction signal from the received data channel signal. As described above, the CDMA receiver includes a plurality of rake receiver fingers and the corrected data signal is produced by subtracted a plurality of corrections signals where each signal is based on an interference signal associated with a finger of the rake receiver other than the finger that is receiving the data channel signal of interest. Therefore, if there are n fingers in the rake receiver, the n−1 interference signals are produced by correlating the appropriate sequence of the n−1 pilot channel pn sequences with the corresponding despreading sequence associated with the pilot channel pn sequence (step 306). The resulting n−1 interference signals are multiplied by the appropriate received pilot channel signal to produce the n−1 correction signals (step 308). The n−1 correction signal are subtracted from the received data channel signal at step 310.

It will be apparent to those skilled in the art that various modifications and variation can be made in the system of the present invention without departing from the spirit or scope of the invention. Thus, it is intended that the present invention cover the modification and variations of this invention provided they come within the scope of the appended claims and their equivalence.

We claim:

1. A method of reducing interference within a received data channel signal in a code-division multiple access (CDMA) receiver including a rake receiver having at least a first finger and a second finger, the method comprising the steps of:

interpolating a value of a pilot channel pseudonoise (pn) sequence between chip period values to produce an interpolated pilot channel on sequence;

producing an interference signal based on a despreading sequence associated with the first finger, and the interpolated pilot channel pn sequence corresponding to the second finger, wherein the step of producing the interference signal comprises the step of correlating the despreading sequence with the interpolated pilot channel pn sequence;

producing a correction signal corresponding to the first finger based on the interference signal and a received pilot signal corresponding to the second finger; and subtracting the correction signal from the received data channel signal to produce a corrected data channel signal.

2. A method in accordance with claim 1, further comprising the steps of:

producing a second interference signal based on the despreading sequence associated with the first finger of a rake receiver and a second pilot channel pn sequence corresponding to a third finger of the rake receiver; and producing a second correction signal corresponding to the first finger based on the second interference signal and a received pilot signal corresponding to the third finger, wherein the step of subtracting comprises the step of subtracting the second correction signal from the received data channel signal to produce the corrected data channel signal.

3. A method in accordance with claim 2 wherein the first finger, the second finger and the third finger are three fingers of n fingers of the rake receiver.

4. A method in accordance with claim 3 further comprising the steps of:

producing n−1 interference signals corresponding to the first finger, each interference signal of the n−1 interference signals based on the despreading sequence associated with the first finger, and one of n−1 pilot channel pn sequences corresponding to the n fingers excluding the first finger; and producing n−1 correction signals corresponding to the first finger, each correction signal based on each interference signal of the n−1 interference signals and a received pilot channel signal corresponding to one of n fingers other than the first finger, wherein the step of subtracting comprises the step of subtracting the n−1 correction signals from the received data channel signal to produce the corrected data channel signal.

5. A method in accordance with claim 4 further comprising the steps of:

producing a group of n−1 interference signals corresponding to each of the n fingers of the rake receiver other than the first finger;

producing a group of n−1 correction signals corresponding to each of the n fingers of the rake receiver other than the first finger; and producing a corrected data channel signal for each of the n−1 fingers other than the first finger by subtracting the group of n−1 correction signals from a corresponding received data channel signal received by each of the n fingers other than the first finger.

6. A method in accordance with claim 1, further comprising the step of:

digitally filtering the interpolated pilot channel pn sequence, the digital filter having an impulse response in accordance with a function equal to the convolution of an input impulse response of an input filter to the CDMA receiver and an output impulse response of a transmitter filter of a transmitter transmitting the received data channel.

7. A method in accordance with claim 6 wherein the step of producing an interference signal comprises the step of correlating the despreading sequence with the interpolated pilot channel pn sequence after the interpolated pilot channel pn sequence has been filtered in the digital filter.

8. A method in accordance with claim 7 wherein the step of producing the correction signal comprises the step of multiplying the interference signal with the received pilot signal corresponding to the second finger.

9. A method in accordance with claim 1, wherein the stop of producing the correction signal corresponding to the first finger comprises the step of multiplying the interference signal and the received pilot signal.

10. A code-division multiple access (CDMA) receiver having an n-finger rake receiver producing n received traffic channel signals in response to a transmitted traffic channel signal of a CDMA transmitter and a locally generated traffic channel despreading sequence and producing n received pilot channel signals in response to a transmitted pilot channel signal of said transmitter and a locally generated pilot channel pseudonoise (pn) sequence, a method for canceling interference present in a transmitted traffic channel signal at said receiver, the method comprising the steps of:

producing n interpolated pilot channel pn sequences, each interpolated pilot channel pn sequence corresponding to one of said fingers and produced by interpolating values of said locally generated pilot channel pn sequence between chip period values;

producing n groups of n−1 interference signals, each group of n−1 interference signals corresponding to one of said fingers, each interference signal of a group corresponding to a finger is produced in response to said locally generated traffic channel despreading sequence corresponding to said finger and one of said n locally generated interpolated pilot channel pn sequences corresponding to another one of said fingers;

producing n groups of n−1 correction signals, each group of n−1 correction signals corresponding to one of said fingers, each correction signal of a group corresponding to a finger is produced in response to an interference signal corresponding to said another one of said fingers and a received pilot channel signal corresponding to said another one of said fingers; and producing n corrected traffic channel signals, each corrected traffic channel signal corresponding to one of said fingers and produced by subtracting from a received traffic channel signal corresponding to said finger each of said n−1 correction signals of a group corresponding to said finger.

11. A method in accordance with claim 10 further comprising the step of:

producing n filtered locally generated interpolated pilot channel pn sequences, each filtered locally generated interpolated pilot channel pn sequence corresponding to one of said fingers and produced by providing said locally generated interpolated pilot channel pn sequence to a digital filter having an impulse response approximating a convolution of an output filter of said CDMA transmitter and an input filter of said CDMA receiver;

the step of producing n groups of n−1 interference signals comprises the step of providing to a cancellation correlator said locally generated traffic channel despreading sequence and one of said n filtered locally generated interpolated pilot channel pn sequences corresponding to another one of said fingers; and the step of producing n groups of n−1 correction signals comprises the step of providing to a multiplier an interference signal corresponding to said another one of said fingers and a received pilot channel signal corresponding to said another one of said fingers.

12. A method in accordance with claim 10, further comprising:

wherein the step of producing n groups of n−1 interference signals comprises the step of providing to a cancellation correlator said locally generated traffic channel despreading sequence and one of said n interpolated pilot channel pn sequences corresponding to another one of said fingers; and wherein producing n groups of n−1 correction signals comprises the step of providing to a multiplier an interference signal corresponding to said another one to said fingers and a received pilot channel signal corresponding to said another one of said fingers.

13. In a code division multiple access (CDMA) receiver having n-finger rake receiver producing n received traffic channel signals in response to a transmitted traffic channel signal of a CDMA transmitter and a locally generated traffic channel despreading sequence and producing n received pilot channel signals in response to a transmitted pilot channel signal of said transmitter and a locally generated pilot channel pseudonoise (pn) sequence, a method for canceling interference present in a transmitted pilot channel signal at said receiver, the method comprising the steps of:

producing n locally generated interpolated pilot channel pn sequences, each locally generated interpolated pilot channel pn sentence corresponding to one of said fingers and produced by interpolating values of said locally generated pilot channel pn sequences between chip period values;

producing n groups of n−1 interference signals, each group of n−1 interference signals corresponding to one of said fingers, each interference signal of a group corresponding to a finger is produced in response to said locally generated traffic channel despreading sequence corresponding to said finger and one of said n locally generated interpolated pilot channel pn sequences corresponding to another one of said fingers;

producing n groups of n−1 correction signals, each group of n−1 correction signals corresponding to one of said fingers, each correction signal of a group corresponding to a finger is produced in response to an interference signal corresponding to said another one of said fingers and a received pilot channel signal corresponding to said another one of said fingers; and producing n corrected pilot channel signals, each corrected pilot channel signal corresponding to a finger and produced by subtracting from a received pilot channel signal corresponding to said finger each of said n−1 correction signals of a group corresponding to said finger.

14. A method in accordance with claim 13 further comprising the step of:

producing n filtered locally generated interpolated pilot channel pn sequences, each filtered locally generated interpolated pilot channel pn sequence corresponding to one of said fingers and produced by providing said locally generated interpolated pilot channel pn sequence to a digital filter having an impulse response approximating a convolution of an output filter of said CDMA transmitter and an input filter of said CDMA receiver;

wherein the step of producing n groups of n−1 interference signals comprises the step of providing to a cancellation correlator said locally generated interpolated pilot channel pn sequence and one of said n filtered locally generated interpolated channel pn sequences corresponding to another one of said fingers; and wherein the step of producing n groups on n−1 correction signals comprises the step of providing to a multiplier an interference signal corresponding to said another one of said fingers and a received pilot channel signal corresponding to said another one of said fingers.

15. A method in accordance with claim 13 further comprising the step of:

wherein the step of producing n groups of n−1 interference signals comprises the step of providing to a cancellation correlator said locally generated pilot channel pn sequence and one of said n filtered interpolated channel pn sequences corresponding to another one of said fingers; and wherein the step of producing n groups on n−1 correction signals comprises the step of providing to a multiplier an interference signal corresponding to said another one of said fingers and a received pilot channel signal corresponding to said another one of said fingers.

16. A noise reduction circuit adapted to be coupled within a code division multiple access (CDMA) receiver including a rake receiver having at least a first finger and a second finger, the CDMA receiver for reducing noise within a received data channel signal transmitted from a transmitter, the noise reduction circuit comprising:

a correlator adapted to correlate an interpolated pilot channel pseudonoise (pn) sequence corresponding to the second finger with despreading sequence corresponding to the second finger with a despreading sequence corresponding to the first finger to produce an interference signal;

a multiplier adapted to multiply the interference signal with a received pilot signal corresponding to the second finger to produce a correction signal; and a subtractor adapted to subtract the correction signal from the received data channel signal to produce a corrected data channel signal.

17. A noise reduction circuit in accordance with claim 16, wherein the CDMA filter includes an input filter and the transmitter includes an output filter, the noise reduction circuit further comprising:

a digital filter coupled to the correlator, the digital filter having an impulse response in accordance with a function equal to the convolution of an impulse response of the input filter and an impulse response of the output filter.

18. A noise reduction circuit in accordance with claim 17, wherein the digital filter is a digital interpolation filter adapted to interpolate a value or a pilot channel pn sequence between chip period values to produce the interpolated pilot channel pn sequence, the correlator adapted to produce the interference signal by correlating the interpolated pilot channel pn sequence with the despreading sequence.

19. A code division multiple access (CDMA) receiver for reducing interference in a received data channel signal transmitted from a transmitter, the receiver comprising:

a rake receiver comprising a first finger and a second finger, wherein the first finger is adapted to receive the data channel signal;

a noise reduction circuit coupled to the first finger and adapted to produce a correction signal based on a received pilot signal corresponding to the second finger, a pilot channel pseudonoise sequence corresponding to the second finger, and a despreading sequence associated with the first finger;

a subtractor coupled to the first finger and the noise reduction circuit, the subtractor adapted to produce a corrected data channel signal based on the received data signal and the correction signal;

a correlator adapted to correlate the pilot channel pseudonoise (pn) sequence corresponding to the second finger with a despreading sequence corresponding to the first finger to produce an interference signal;

a multiplier adapted to multiply the interference signal with a received pilot signal corresponding to the second finger to produce a correction signal; and a digital interpolation filter coupled to the correlator, the digital interpolation filter having an impulse response in accordance with a function equal to the convolution of an impulse response of the input filter and an impulse response of an output filter of the transmitter, the digital interpolation filter adapted to interpolate a value of the pilot channel pn sequence between chip period values to produce an interpolated pilot channel pn sequence, the correlator adapted to produce the interference signal by correlating the interpolated pilot channel pn sequence with the despreading sequence.

20. In a code division multiple access (CDMA) receiver having an n-finger rake receiver producing n received traffic channel signals in response to a transmitted traffic channel signal of a CDMA transmitter and a locally generated traffic channel despreading sequence and producing n received pilot channel signals in response to a transmitted pilot channel signal of said transmitter and a locally generated pilot channel pseudonoise (pn) sequence, a system for canceling interference present in a transmitted traffic channel signal at said receiver, the system comprising:

n cancellation circuits, each corresponding to one of said fingers and producing n−1 interference signals, each interference signal of a group corresponding to a finger produced in response to said locally generated traffic channel despreading sequence corresponding to said finger and one of said n locally generated pilot channel pn sequences corresponding to another one of said fingers;

each cancellation circuit includes an interpolator, said interpolator producing an interpolated pilot channel pn sequence corresponding to one of said fingers and representing interpolated values of said pilot channel pn sequence between chip period values;

each cancellation circuit producing n−1 correction signals, each correction signal of a group corresponding to a finger produced in response to an interference signal corresponding to said another one of said fingers and a received pilot channel signal corresponding to said another one of said fingers; and n correction circuits, each corresponding to a finger and subtracting from a received traffic channel signal corresponding to said finger each of said n−1 correction signals of a group corresponding to said finger.

21. A system in accordance with claim 20, wherein:

each cancellation circuit includes a digital filter having an impulse response approximating a convolution of an output filter of said CDMA transmitter and an input filter of said CDMA receiver and producing n filtered locally generated pilot channel pn sequences, each filtered locally generated pilot channel pn sequence corresponding to one of said fingers and produced in response to said locally generated pilot channel pn sequence;

each cancellation circuit includes n−1 cancellation correlators, each producing one of said n−1 interference signals in response to said locally generated pilot channel pn sequence and one of said n filtered locally generated pilot channel pn sequences corresponding to another one of said fingers; and each cancellation circuit includes n−1 multipliers, each producing one of said n−1 correction signals in response to an interference signal corresponding to said another one of said fingers and a received pilot channel signal corresponding to said another one of said fingers.

22. A system in accordance with claim 20, wherein:

Each cancellation circuit includes n−1 cancellation correlators, each producing one of said n−1 interference signals in response to said locally generated traffic channel despreading sequence arid one of said n filtered locally generated pilot channel pn sequences corresponding to another one of said fingers; and each cancellation circuit includes n−1 multipliers, each producing one of said n−1 correction signals in response to an interference signal corresponding to said another one of said fingers and a received pilot channel signal corresponding to said another one of said fingers.

23. In a code division multiple access (CDMA) receiver having an n-finger rake receiver producing n received traffic channel signals in response to a transmitted traffic channel signal of a CDMA transmitter and a locally generated traffic channel despreading sequence and producing n received pilot channel signals in response to a transmitted pilot channel signal of said transmitter and a locally generated pilot channel pseudonoise (pn) sequence, a system for canceling interference present in a transmitted pilot channel signal at said receiver, the system comprising:

n cancellation circuits, each corresponding to one of said fingers and producing n−1 interference signals, each interference signal of a group corresponding to a finger produced in response to said locally generated pilot channel pn sequence corresponding to said finger and one of said n locally generated pilot channel pn sequences corresponding to another one of said fingers;

each cancellation circuit includes an interpolator, said interpolator producing an interpolated pilot channel pn sequence corresponding to one of said fingers and representing interpolated values of said pilot channel pn sequence between chip period values;

each cancellation circuit producing n−1 correction signals, each correction signal of said grouped corresponding to a finger produced in response to an interference signal corresponding to said another one of said fingers and a received pilot channel signal corresponding to said another one of said fingers; and n correction circuits, each corresponding to a finger and subtracting from a received pilot channel signal corresponding to said finger each of said n−1 correction signals of a group corresponding to said finger.

24. A system in accordance with claim 23, wherein:

each cancellation circuit includes a digital filter having an impulse response approximating a convolution of an output filter of said CDMA transmitter and an input filter of said CDMA receiver and producing n filtered locally generated pilot channel pn sequences, each filtered locally generated pilot channel pn sequence corresponding to one of said fingers and produced in response to said locally generated pilot channel pn sequence;

each cancellation circuit includes n−1 cancellation correlators, each producing one of said n−1 interference signals in response to said locally generated traffic channel despreading sequence and one of said n filtered locally generated pilot channel pn sequences corresponding to another one of said fingers; and each cancellation circuit includes n−1 multipliers, each producing one of said n−1 correction signals in response to an interference signal corresponding to said another one of said fingers and a received pilot channel signal corresponding to said another one of said fingers.

25. A system in accordance with claim 23, wherein:

each cancellation circuit includes n−1 cancellation correlators, each producing one of said n−1 interference signals in response to said locally generated pilot channel pn sequences and one of said n filtered locally generated pilot channel pn sequences corresponding to another one of said fingers; and each cancellation circuit includes n−1 multipliers, each producing one of said n−1 correction signals in response to an interference signal corresponding to said sootier one of said fingers and a received pilot channel signal corresponding to said another one of said fingers.

* * * * *